United States Patent [19]

Grant

[11] 4,167,874
[45] Sep. 18, 1979

[54] LIQUID VOLUME MEASURING DEVICE

[75] Inventor: John D. Grant, Rockford, Ill.

[73] Assignee: Sundstrand Corporation, Rockford, Ill.

[21] Appl. No.: 909,777

[22] Filed: May 26, 1978

[51] Int. Cl.² ............................................. G01F 23/00
[52] U.S. Cl. ................................... 73/290 R; 73/290 B
[58] Field of Search ................. 73/290 R, 290 B, 308, 73/313; 340/623, 624; 336/136, 30, 45; 33/DIG. 5

[56] References Cited

U.S. PATENT DOCUMENTS

| | | | |
|---|---|---|---|
| 2,074,959 | 3/1937 | Guest | 73/290 R |
| 2,294,198 | 8/1942 | Morrel | 73/290 B |
| 2,420,539 | 5/1947 | Hornfeck | 33/DIG. 5 |
| 2,516,092 | 7/1950 | Roessler | 336/136 |
| 2,967,427 | 1/1961 | Le Blang | 73/149 |
| 3,459,042 | 8/1969 | Brown | 73/313 |
| 3,553,842 | 1/1971 | Gerber | 33/1 |
| 3,654,549 | 4/1972 | Maurer | 324/34 D |
| 3,974,695 | 8/1976 | Lerner | 73/304 C |

*Primary Examiner*—S. Clement Swisher
*Assistant Examiner*—Denis E. Coor
*Attorney, Agent, or Firm*—Wegner, Stellman, McCord, Wiles & Wood

[57] ABSTRACT

A device for indicating the volume of liquid in a fuel tank or like container includes a linear variable differential transformer (LVDT) mounted within the tank, which is divided into a liquid containing section and a gas containing section by a longitudinally movable piston. Pressure gas is provided to the gas containing section of the tank through a port in a tank wall, and urges the piston to follow the liquid level in the tank. The LVDT has a fixed coil housing with a fixed electrical input and a rotatable core actuator. The core actuator is coupled for rotation in response to movement of the piston. Rotation of the actuator effects translational movement of the core within the coil, thereby producing a variable electrical output in response to changes in liquid volume.

7 Claims, 3 Drawing Figures

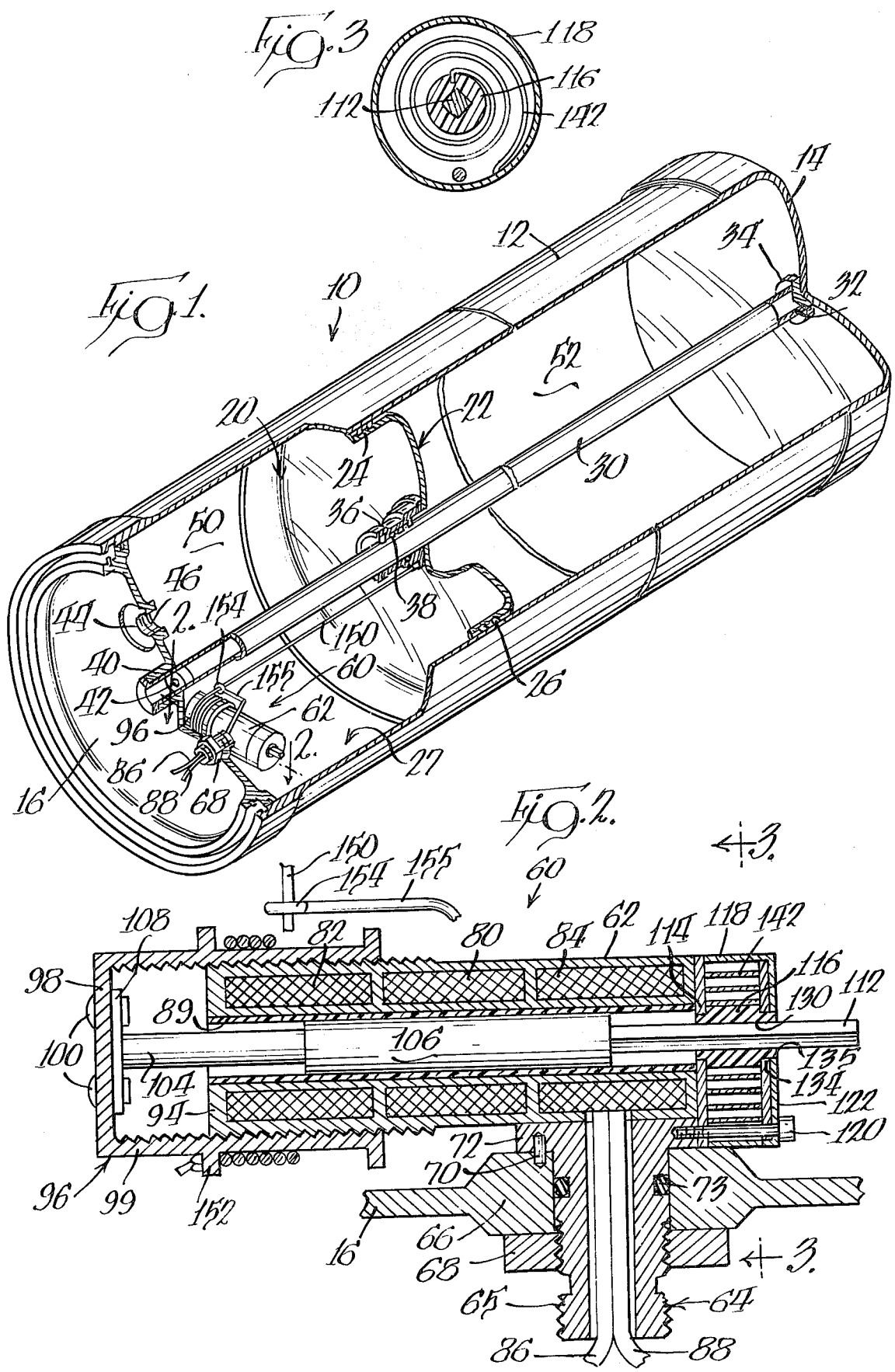

LIQUID VOLUME MEASURING DEVICE

FIELD OF THE INVENTION

This invention relates to liquid volume indicators and, more specifically, this invention relates to inductive fuel tank liquid volume indicators.

BACKGROUND OF THE INVENTION

The problems involved in the measurement of liquid volume in tanks, and especially in tanks carrying corrosive liquids, are considerable. These problems are emphasized in fuel tanks of modern jet aircraft, which undergo extreme changes in temperature, pressure, and attitude.

For example, many aircraft utilize corrosive fuels such as hydrazine-water blends. Such corrosive liquids may be volatile and incompatible with conventional construction materials such as copper, plastic, etc. Therefore, not only must the tank be of stainless steel or another corrosion-resistant material, but any auxiliary device, such as a fuel quantity indicator, must be equally resistant to corrosion.

The measurable volume of liquid fuel in an aircraft tank is constantly changing, mainly due to consumption. Constant changes in volume are also caused by expansion and contraction of the liquid in response to temperature and pressure changes caused by a change in altitude, for example. Fuel quantity indicators must be responsive to even small changes in liquid volume.

It is also important that liquid volume indicators be durable and reliable, with few moving parts which, if worn, may cause early failure.

SUMMARY OF THE INVENTION

It is an object of the present invention to solve one or more of the problems discussed above.

According to the present invention, an inductive fuel quantity measuring device is mounted within a fuel tank to convert linear movement of a liquid level following piston into a variable electrical output which is proportional to the volume of fuel in the tank.

A longitudinally movable piston is mounted in the tank to partition the tank into a liquid containing section and a gas containing section. Pressure gas, such as nitrogen, is fed to the gas containing section through a port in the tank wall to maintain the piston in following relation to the level of fuel, regardless of the attitude of the tank.

The inductive device is a linear variable differential transformer (LVDT) with coil means and a core linearly movable therein. A fixed electrical input is supplied to the coil means, which is mounted within a tubular housing fixed within the gas containing section of the tank. A drum-shaped core actuator is threadably mounted for rotation on one end of the coil housing, and the core is fixed thereto.

The core actuator is coupled to the piston by a cable, and rotates in response to linear movement of the piston. A stationary cable guide cooperates with the rotation and translation of the core actuator to result in level winding of the cable thereabout. Rotation of the actuator effects translation of the core within the coil means, resulting in a variable electrical output.

The components of the inductive device are all of Teflon, stainless steel, or similar non-corrodible material to ensure long life and reliable performance.

BRIEF DESCRIPTION OF THE DRAWINGS

FIG. 1 is a fragmentary perspective view of a fuel tank and a liquid volume indicating device according to the invention;

FIG. 2 is a sectional view of the liquid volume indicating device of FIG. 1, taken generally along the line 2—2 of FIG. 1; and FIG. 3 is a sectional view of the liquid volume indicating device of FIG. 2, taken along the line 3—3 of FIG. 2.

DESCRIPTION OF THE PREFERRED EMBODIMENT

Referring to FIG. 1, a fuel tank 10 employing the volumetric measuring device of the invention is illustrated. The fuel tank 10 is illustratively a jet aircraft emergency power unit fuel tank, containing hydrazine or another fuel, but it is understood that the invention is not limited to a particular type or design of tank. The fuel tank 10 has a cylindrical shell 12 (shown fragmented in FIG. 1) sealed with an end cap 14 and an end wall 16.

A free moving member, illustratively a concave piston 20 of circular cross section, is mounted for longitudinal movement within the fuel tank 10. The piston 20 has a generally curved wall 22 and an integral sidewall 24 extending therefrom axially. The sidewall 24 is of a cylindrical configuration, with a diameter slightly less than the inner diameter of the shell 12. Suitable annular seals 26 are interposed between the sidewall 24 and the interior surface 27 of the shell 12.

A tubular fuel conduit 30 extends from the end cap 14, through the piston 20, and through the end wall 16. The conduit 30 functions alternately as a fuel inlet or outlet, and stabilizes the piston as it reciprocates within the shell 12. One end 32 of the conduit 30 is secured to the end cap 14 at a fuel port 34, which positions the conduit 30 generally centrally of the shell 12 and provides fluid communication between the conduit 30 and the interior of the shell 12.

The conduit 30 extends through a bushing 36 extending at right angles from the wall 22. The bushing 36 is provided with one or more annular seals 38 to allow movement of the piston 20 on the conduit 30 while minimizing leakage of liquid or vaporized fuel from one side of the piston 20 to the other.

The conduit 30 extends through the end wall 16 and communicates with a fuel line 40, and includes a suitable pressure limit device, such as a burst disc 42. The fuel line 40 communicates with the combustion chamber of an emergency power unit (not shown). Suitable connectors (not shown) in the fuel line 40 allow refueling of the fuel tank 10 through the conduit 30.

A gas entry port 44 is located in the end wall 16 and has threads 46 for receipt of a pressure gas supply nozzle (not shown) for delivery of pressure gas, such as nitrogen, to the interior of the shell 12, for purposes discussed below.

The fuel tank 10 of FIG. 1 is suitable for use with hydrazine fuels. Such fuels are volatile and corrosive, and the components fo the fuel tank 10 must be fabricated of non-corrodible materials, such as stainless steel and Teflon, for example.

The piston 20 divides the interior of the fuel tank 10 into two sections 50 and 52. The piston 20 will be positioned nearest the end wall 16 when the fuel tank 10 is completely filled with fuel. The relative volumes of the tank sections 50 and 52 are variable and are determined by the position of the piston 20, in response to the quantity of fuel in the tank 10.

The gas port 44 is connected to a source of nitrogen or other pressure gas in order to provide positive pressure in the tank section 50. The magnitude of the pressure in the tank section 50 should be great enough to ensure that fuel is forcibly expelled at a desired pressure from section 52 as a result of rightward movement of the piston 20 (in FIG. 1) regardless at the attitude or state of acceleration of the aircraft.

The tank section 50 will contain small amounts of vaporized fuel in addition to pressure gas, as the seals 26 and 38 are not capable of complete sealing. An increase in the amount of the fuel in the tank section 52 will result in leftward movement of the piston 20 as gas is forced from the tank section 50 through the port 44.

A decrease in the volume of liquid in the tank section 52 may be effected by consumption of the fuel, in which case the fuel is conducted from the tank section 52 through the conduit 30 and the fuel line 40. Contraction and expansion of fuel, caused by changes in temperature or pressure, will also result in movement of the piston 20. Such changes in conditions may occur as the ambient temperature changes or as the aircraft ascends or descends.

The fuel tank 10 need not employ a piston such as the piston of FIG. 1, but may use any suitable movable member which effects longitudinal movement in following relation to the volume of liquid. A metal bellows is an example of a suitable movable member.

A liquid volume indicating device is illustrated in FIGS. 1-3. The device comprises a linear variable differential transformer (LVDT) 60 mounted on the end wall 16 and substantially contained within the tank section 50.

The construction of the LVDT 60 is best described with reference to FIG. 2. The LVDT 60 includes a generally tubular housing 62 with a combination electrical conduit and mounting arm 64 extending outwardly therefrom at substantially right angles.

The arm 64 extends through the end wall 16 at a section 66 of increased thickness in the end wall 16. The section 65 of the conduit 64 which extends through the end wall 16 is threaded and receives a nut 68 which secures the LVDT 60 to the end wall 16. A locating pin 70, held within the wall section 66 and a flange 72 extending radially outwardly of the conduit 64 and integral with the housing 62, retains the LVDT 60 in its position adjacent the end wall 16. An annular seal surrounds the conduit 64 within the wall section 66.

Within the housing 62 are an input coil 80 and one or more output coils 82 and 84. The input coil 80 receives a fixed, relatively low magnitude electrical input from leads 86 extending through the wall 16 via the conduit 64. Electrical output leads 88 extend from the output coils 82 and 84 to a suitable readout device in the aircraft cabin.

A Teflon (or equivalent low friction material) bushing 89 lines the internal bore of the housing 62. One end 94 of the housing 62 is externally threaded and has a rotatable drum 96 threaded thereon. The drum 96 comprises an end wall 98 and an upstanding cylindrical wall 99 extending therefrom. Fixed to the wall 98 by suitable fasteners 100 is a shaft 104 carrying a magnetic core 106. The fasteners 100 extend through the wall 98 and a base 108 extending radially outwardly from the shaft 104. Rotation of the drum 96 on the threaded housing 62 effects translation of the drum 96 and the shaft 104 along the axis corresponding to the shaft 104.

An end 112 of the shaft 104 extends axially from the end of the core 106 opposite the end closest to the drum 96. The shaft end 112 extends through a return spring assembly 114. The spring assembly 114 comprises a collar 116 of Teflon or similar material circumscribed by a tubular wall 118 secured to the housing 62 by a screw 120 extending through annular plates 121 and 122 and the flange 72.

The shaft end 112 is of a noncircular cross section (best seen in FIG. 3) identical to the cross section of a bore 130 in the collar 116. The noncircular cross section prevents relative rotation between the shaft end 112 and the collar 116. The collar 116 extends through the end plate 112 and receives one end of a flat torsion spring 142 which spirals outwardly therefrom toward the wall 117 and is received thereby, as seen in FIG. 3.

Referring again to FIGS. 1 and 2, the drum 96 is connected to the piston 20 by coupling means which are shown as a cable 150 secured to the piston 20 and wound about the wall 99 and secured thereto at an anchor 152 (FIG. 2). Level winding of the cable 150 about the wall 99 is effected during rotation of the drum 96 by a fixed cable guide eyelet 154 on the arm 155, secured as at the conduit 64 near the end wall 16 (best seen in FIG. 1).

Translational motion of the piston 20 in response to liquid volumetric changes in the tank section 52 will result in rotation of the drum 96 by the reeling or unreeling action of the cable 150. Such rotation of the drum 96 will effect translation of the shaft 104 and the core 106. During translation, the shaft end 112 will slide through the bore 130 of the collar 116.

Since the shaft 104 is fixed to the end wall 98, the attached shaft 104, the core 106 and the shaft end 112 will rotate. Since the bore 130 of the collar 116 snugly fits the shaft end 112, the collar 116 will rotate therewith.

Rotation of the collar 116 is opposed by the torsion spring 142. Such resistance to rotation assures that the cable 150 remains taut regardless of whether the rotation of the drum 96 is clockwise or counter-clockwise, i.e., whether the liquid volume in the tank is increasing or decreasing, respectively.

Resistance to rotation of the shaft end 112 and the resulting tautness of the cable 150 results in accurate positioning of the core 106 within the LVDT 60 as a function of the position of the piston 20. As is well-known in the art, an LVDT which receives a fixed electrical input produces a variable electrical output dependent on the position of the core within the coils.

In the case of the device of FIG. 2, a fixed electrical input is supplied through leads 86, and an electrical output is delivered through leads 88. The output will vary depending on the position of the core 106 within the coils 80-84. Since the position of the core 106 is determined by the position of the piston 20, the device of FIG. 2, when connected to a suitable read-out device, provides an accurate instantaneous analog display of the liquid displacement in the tank 10.

The housing is hermetically sealed, so as to afford protection for the coils against hydrazine-water vapor present in the section 50 within which the LVDT 60 is mounted.

It is apparent that the simplicity of the construction and lack of many moving components results in a reliable, durable, vibration insensitive volume indicating output device. Output is substantially unaffected by vibration, since the force of the torsion spring 142 against the drum 96 prevents unwanted rotation of the drum 96.

Since the Teflon bushing 89 insulates the core 106 from the housing 62, wear due to mechanical contact is very low.

It will be apparent to those skilled in the art that a fuel volume indication system according to the foregoing description will provide accurate indications of fuel level over a wide variety of conditions.

I claim:

1. An indicator for measuring the fluid level in a tank, said tank including a member therein movable in following relation to said fluid level, said indicator being mounted in said tank and comprising:
   (a) a housing having a cylindrical outer surface fixed to said tank;
   (b) at least one annular inductive coil within said housing;
   (c) a core actuator comprising a cup-shaped drum with an end wall and a tubular wall extending therefrom and having a cylindrical inner surface receiving said housing outer surface, said tubular wall further including a cylindrical outer surface;
   (d) means interconnecting said actuator inner surface and said housing outer surface for rotation and translation of said actuator on said housing, said interconnecting means comprising mating threads on said actuator inner surface and on said housing outer surface;
   (e) a core fixed to said actuator for movement therewith and extending through said coil for translation therein; and
   (f) a cable windable about said actuator outer surface and anchored thereto coupling said actuator to said movable following member for rotation in response to movement of said following member whereby said core effects translational movement within said coil in response to movement of said following member.

2. An indicator for measuring the fluid level in a tank, said tank including a member therein movable in following relation to said fluid level, said indicator being mounted in said tank and comprising;
   (a) a housing fixed to said tank;
   (b) at least one annular inductive coil within said housing;
   (c) a core actuator surrounding one end of said housing;
   (d) means interconnecting said actuator and said housing for rotation and translation of said actuator on said housing;
   (e) a core fixed to said actuator for movement therewith and extending through said coil for translation therein;
   (f) means coupling said actuator to said movable following member for rotation in response to movement of said following member wherein said core effects translational movement within said coil in response to movement of said following member;
   (g) a shaft extending axially from one end of said core;
   (h) yieldable urging means engaged by an end of said shaft for opposing rotation of said core actuator; and
   (i) means for delivering a fixed electrical input to said coil and means for delivering an electrical output therefrom, said output being inductively variable as a function of the position of said core within said coil.

3. The indicator of claim 2 wherein said end of said shaft of a noncircular cross section and said yieldable rotation opposing means comprises a collar slidably receiving said shaft, said collar including a bore of like cross section as said end of said shaft for receipt of said shaft end whereby relative rotation between said shaft end and said bore is prevented, said collar being mounted for rotation in said housing and engaged by a spring in said housing whereby rotation is resisted.

4. The indicator of claim 3 wherein said spring is a flat torsion spring captured by said collar and said housing and spiraling between said collar and said housing.

5. An indicator for measuring the fluid level in a tank, said tank including a member therein movable in following relation to said fluid level, said indicator being mounted in said tank and comprising:
   (a) a housing fixed to said tank;
   (b) at least one annular inductive coil within said housing;
   (c) a core actuator surrounding one end of said housing, said core actuator comprising a cup-shaped drum with an end wall and a tubular wall extending therefrom, said drum being mounted on said housing;
   (d) means interconnecting said actuator and said housing for rotation and translation of said actuator on said housing;
   (e) a core fixed to said actuator for movement therewith and extending through said coil for translation therein, said core being integrally formed on a shaft extending from said end wall and concentric with said tubular wall, the end of said shaft farthest from said end wall engaging yieldable means integral with said tubular housing for opposing rotation of said drum;
   (f) means coupling said actuator to said movable following member for rotation in response to movement of said following member whereby said core effects translational movement within said coil in response to movement of said following member; and
   (g) means for delivering a fixed electrical input to said coil and means for delivering an electrical output therefrom, said output being inductively variable as a function of the position of said core within said coil.

6. An indicator for measuring the fluid level in a tank, said tank including a member therein movable in following relation to said fluid level, said indicator being mounted in said tank and comprising;
   (a) a housing fixed to said tank;
   (b) at least one annular inductive coil within said housing;
   (c) a core actuator surrounding one end of said housing, said core actuator comprising a cup-shaped drum with an end wall and a tubular wall extending therefrom, said tubular wall having a cylindrical outer surface and said drum being mounted on said housing;
   (d) a core fixed to said actuator for movement therewith and extending through said coil for translation therein;
   (f) a guide eyelet fixed relative to said housing; and
   (g) a cable windable about said drum outer surface and extending through said guide eyelet whereby said cable is wound evenly about said drum outer surface as said drum moves linearly on said housing and relative to said guide eyelet, whereby said actuator is coupled to said movable following member for rotation in response to movement of said following member and said core effects translational movement within said coil in response to movement of said following member.

7. An indicator for measuring the liquid level in a tank, said tank including a liquid follower mounted in said tank for longitudinal movement in following relation to said liquid level, said device comprising:
   (a) a tubular housing fixed within said tank;
   (b) annular inductive coil means within said housing;
   (c) a cup-shaped cable storage drum with an end wall and a tubular side wall extending therefrom and surrounding the outer periphery of one end of said housing, said side wall threadably received on said housing for rotation and translation thereon;
   (d) a shaft with a core movable therewith, said shaft fixed to said end wall and extending from said end wall and concentric with said tubular wall, the end of said shaft farthest from said end wall being of noncircular cross section and slidably received in a bore of like cross section in a collar, said collar being rotatably mounted in said housing at the end thereof farthest from said drum, said bore being of a size to prevent relative rotation of said collar and said shaft, said collar receiving one end of a flat torsion spring, said spring spiraling outwardly from said collar toward said housing and received thereby, whereby rotation of said shaft is opposed;
   (e) a cable anchored on said tubular wall and partially wound thereabout at one end of said cable, the other end of said cable secured to said liquid follower whereby said drum is rotated in response to movement of said follower, said housing including a stationary outstanding arm terminating in a cable-receiving eyelet for positioning of said cable during rotation and translation of said drum to ensure even winding of said cable thereon; and
   (f) means for delivering an electrical input to said coil means and means for delivering an electrical output from said coil means, said output being variable as a function of the position of said core within said coil.

* * * * *